United States Patent [19]

Shackelford

[11] Patent Number: 4,717,612
[45] Date of Patent: Jan. 5, 1988

[54] FASTENERS FOR HONEYCOMB STRUCTURES

[75] Inventor: James R. Shackelford, Cuyahoga Falls, Ohio

[73] Assignee: The B. F. Goodrich Company, Akron, Ohio

[21] Appl. No.: 920,545

[22] Filed: Oct. 20, 1986

[51] Int. Cl.⁴ .............................................. B32B 3/12
[52] U.S. Cl. ...................................... 428/116; 52/806; 411/34
[58] Field of Search .................. 428/116, 117, 118; 52/806; 411/34

[56] References Cited

U.S. PATENT DOCUMENTS

| | | | |
|---|---|---|---|
| 2,880,830 | 4/1959 | Rohe | 52/806 X |
| 3,078,002 | 2/1963 | Rodgers, Jr. | 428/116 X |
| 3,296,765 | 1/1967 | Rohe et al. | 52/806 X |
| 3,434,262 | 3/1969 | Lawrence | 52/806 X |
| 3,771,272 | 11/1973 | Mihaly et al. | 52/806 X |
| 3,789,728 | 2/1974 | Shackelford | 428/24 X |
| 3,879,915 | 4/1975 | Atwater | 211/182 X |
| 3,928,905 | 12/1975 | Atwater | 29/446 |
| 4,171,785 | 10/1979 | Isenberg | 428/31 X |
| 4,370,372 | 1/1983 | Higgins et al. | 428/116 |
| 4,462,193 | 7/1984 | Ericson | 52/264 X |
| 4,577,450 | 3/1986 | Large | 52/787 |

Primary Examiner—Henry F. Epstein
Attorney, Agent, or Firm—Joseph Januszkiewicz

[57] ABSTRACT

A honeycomb panel with a threaded fastener secured thereto wherein the fastener has a flanged portion abutting the outer surface of the upper plate member of the panel and its bulged portion within the core of the honeycomb panel but cooperative with the flange to captively secure such fastener into the honeycomb panel.

4 Claims, 8 Drawing Figures

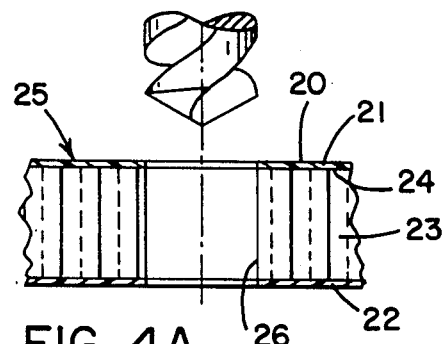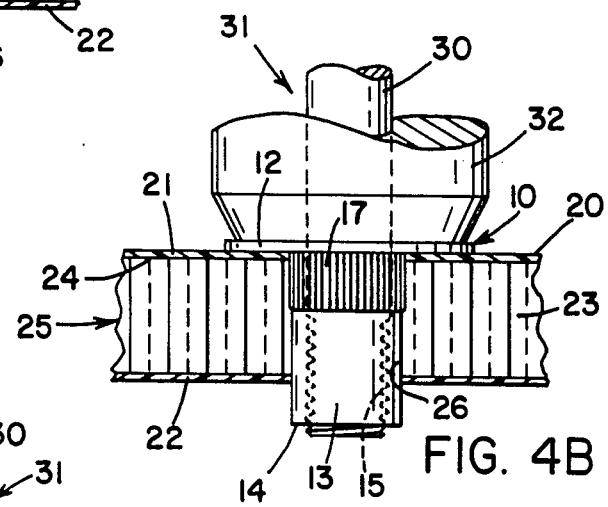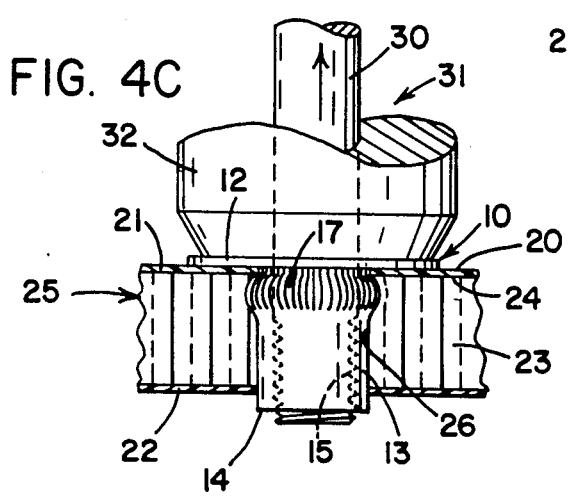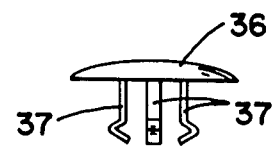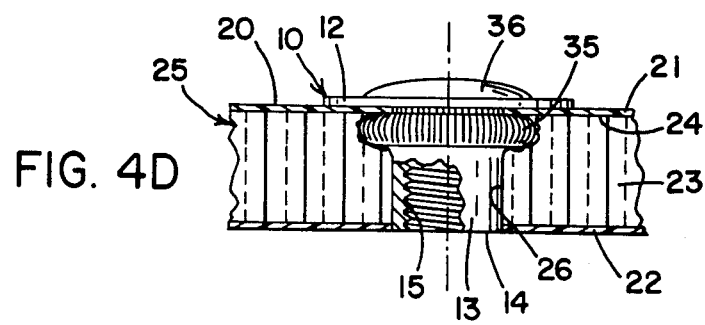

FASTENERS FOR HONEYCOMB STRUCTURES

BACKGROUND OF THE INVENTION

This invention relates to fasteners and more particularly to a thread locking type fastener for use in composite or honeycomb structures.

In honeycomb structures, special attention is directed to the preparation at those locations wherein attachments of hardware are to be made. This can take the form of modifying the honeycomb structure during manufacture at those locations where the attachments are to be made or modifying the honeycomb construction just prior to installation of an attachment. Both of these are time consuming and expensive. Although the honeycomb structure is relatively thick, it does employ by its construction two relatively very thin sheets that are spaced from each other with the honeycomb structure disposed normally therebetween, thereby presenting problems of attachment. In the case of composite panels, the manufacturer normally employs a potted-in insert to obtain acceptable tension and shear loads on the fastener. These, of course, are recognized as being time consuming and expensive to install. In addition to potted-in inserts, press-in type inserts are also used.

The present invention can be installed without any additional preparation of the honeycomb structure and further can be installed entirely from one side.

SUMMARY OF THE INVENTION

A honeycomb structure has a pair of spaced plates and supporting honeycomb core therebetween. The invention is directed to the locating of a fastener therein such that the outer flange of the fastener rests against the exterior surface of one of the plates. The fastener has a hollow threaded bore in the shank with a portion of such shank deformed radially outwardly within the core and captively engaging the other side of the plate on which the flange rests to securely fasten the fastener to the honeycomb panel.

BRIEF DESCRIPTION OF THE DRAWINGS

FIG. 4A is a cross sectional view of a honeycomb structure illustrating the first step of boring a hole in the structure in the preparation of securing a fastener thereto;

FIG. 4B is a cross sectional view of a fastener positioned within the bore of a honeycomb structure with an upsetting tool connected to the fastener;

FIG. 4C is a side elevational view in cross section of the honeycomb structure and fastener showing the fastener being upset to attach it into the honeycomb structure;

FIG. 4D is a side elevational view of a honeycomb structure with fastener attached thereto and with a plug closure in one end thereof; and FIG. 5 is a side elevational view of a plug with depending spring clips.

DESCRIPTION OF THE PREFERRED EMBODIMENT

Figure 1:
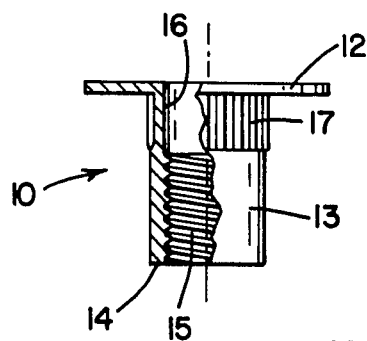
FIG. 1 is a side elevational view of the fastener with a portion broken away to illustrate the threaded portion.

Referring to the drawings wherein like reference numerals designate like or corresponding parts throughout the several views, there is shown in FIG. 1 a fastener 10. The fastener 10 has an upper flat head 12 that is annular in shape and a longitudinally extending shank or hollow cylindrical body 13, an interior end 14, a stepped bore with a lower threaded portion 15 and an upper bore portion 16. The exterior wall surface of the shank body 13 directly opposite the upper bore portion 16 is ribbed or serrated as at 17 to present a relatively thin wall tubular portion that is adapted to be outwardly expanded and axially shortened or collapsed to a continuous, annular outwardly bulged form of determinate radial extent having a relatively flattened, substantially closed looped shape in axial cross section as shown especially in FIG. 3 so as to engage and seat uniform and fit tightly against the back side of a skin panel to be described. Such vertical serrations or slits facilitate the upsetting of such upper portion of the fastener.

The head 12 of the fastener 10 has a radius equal to or greater in length than the collapsed length of the cylindrical body 13 to provide a maximum bearing surface against an upper honeycomb skin surface of a honeycomb panel 25 to be described.

Figure 2:
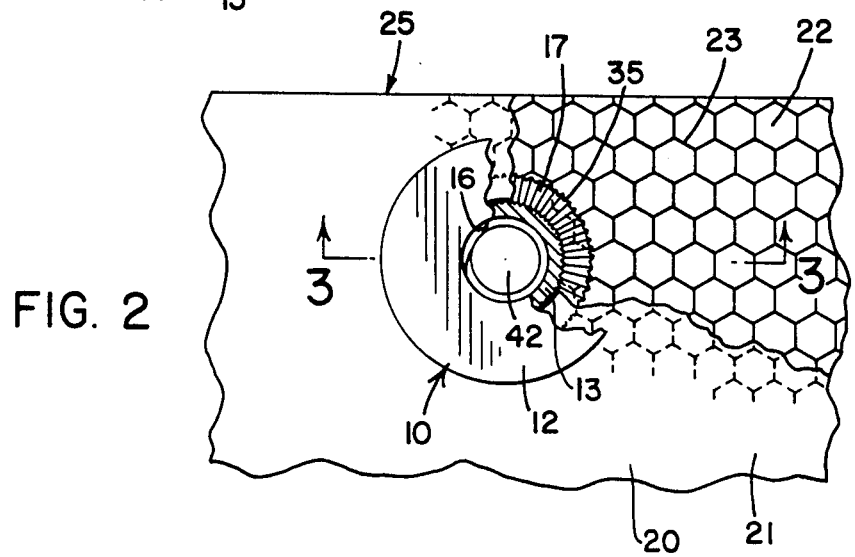
FIG. 2 is a plan view of the fastener attached to a composite honeycomb structure and with a portion of the fastener and honeycomb structure broken away to illustrate the relationship of the parts.
Figure 3:
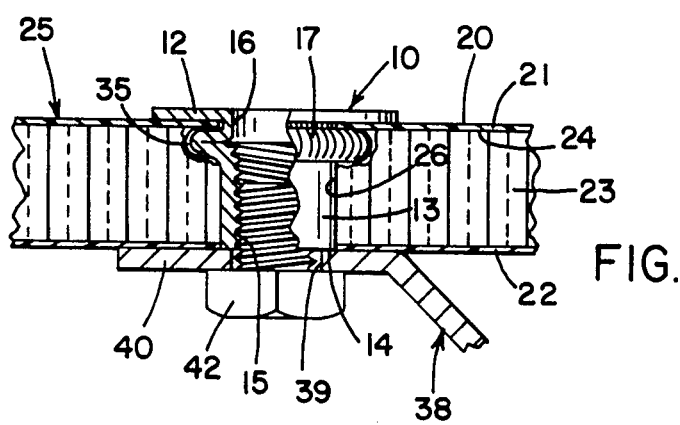
FIG. 3 is a side elevational view of the fastener and the honeycomb structure taken on line 3—3 of FIG. 2 with a portion of the fastener shown in full.

Honeycomb panel 25 as seen in FIGS. 2 and 3 has an upper plate 21 and a lower plate 22 interconnected by vertically disposed supporting honeycomb 23, which honeycomb is formed by hexagonal structural cores presenting a honeycomb effect. Honeycomb panel's 25 upper plate 21 has an upper skin surface 20 and a lower or interior skin surface 24. This is but one example of a honeycomb structure and the invention is applicable to other types of such structures including foam filled interiors or where the interior is a corrugated design.

To attach the fastener 10 to the honeycomb panel 25, a hole 26 is drilled through the honeycomb panel as illustrated in FIG. 4A. Fastener 10 is inserted into the hole 26 with the annular shaped head 12 flat against the upper skin surface 20 and with the shank or hollow threaded cylindrical body portion 13 projecting out of the hole 26. A draw rod 30 of an upsetting tool 31 is threadedly connected to the threaded portion of the fastener as illustrated in FIG. 4B. A non-rotatable annular anvil 32 is drawn down over the rod 30 and has its lower surface in engagement or bearing against the head 12. As the rod 30 is moved upwardly (as viewed in FIGS. 4B and 4C), pressure is applied to move the tubular body 13 upwardly and since the serrated portion 17 of the fastener 10 is substantially thinner than the threaded portion 15, the serrated portion 17 will buckle until such buckled or bulged portion designated 35 in FIG. 3 is applied firmly against the blind lower skin surface 24 of upper panel 21 thereby firmly sandwiching such plate 21 between such buckled portion 35 and the flange 12 of the fastener 10. It is to be noted that the flange 12 presents a substantially large annular surface that cooperates with the buckled portion 35 to provide a large bearing surface for distributing the load thereover. A plug 36 having a rounded head with three depending spring clips 37 extending outwardly therefrom is pressed into the upper bore portion of the hollow cylindrical body 13 of the fastener opposite the threaded end portion 15. Thus the lower threaded portion 15 is receptive to receiving the threaded end of another fixture that can be fastened to the honeycomb panel 25. A fixture 38 with a bore 39 in the flat section 40 of such fixture may be securely fastened to the honeycomb panel 25 by a threaded bolt 42.

Various modifications are contemplated and may obviously be resorted to by those skilled in the art without departing from the described invention, as hereinafter defined by the appended claims, as only a preferred embodiment thereof has been disclosed.

I claim:

1. A honeycomb panel with at least one fastener insert therein; said panel having an upper cover sheet member and a lower cover sheet member separated by a honeycomb core therebetween; at least one fastening hole extending through said cover sheet members and through said honeycomb core; each of said sheet members having an exterior surface and an interior surface; said interior surfaces being connected to said honeycomb core; an integral one piece hollow fastener having a flat annular thin flange, a sleeve and an annular edge at one end of said sleeve; said flat flange located at the other end of said sleeve; said fastener located in said hole and extending from the exterior surface of one of said cover sheet members to have said annular edge adjacent the exterior surface of the other one of said cover sheet members; said hollow fastener having a central bore; said flat annular thin flange abuttingly engaging the exterior surface of said one sheet member; said bore of said fastener having at least a portion thereof threaded, and said sleeve having a bulged portion engaging the interior surface of said one sheet member opposite said exterior surface engaged by said flange to captively locate said fastener in said honeycomb panel as said annular edge contacts the side of said hole in said other one of said cover sheet members.

2. A honeycomb panel as set forth in claim 1 wherein said flange has a diameter substantially larger than the diameter of said bulged portion of said sleeve in said collapsed upset condition.

3. A honeycomb panel as set forth in claim 2 wherein said flange has a diameter that is at least twice the length of said sleeve in a collapsed condition with said bulged portion.

4. A honeycomb panel as set forth in claim 2 wherein a spring biased plug is received by said bore of said fastener; and said plug has a flat annular surface that engages the exterior surface of said other cover sheet member.

* * * * *